United States Patent [19]
Yarborough et al.

[11] Patent Number: 5,327,442
[45] Date of Patent: Jul. 5, 1994

[54] SOLID STATE LASER WITH DUAL COOLING LOOPS

[75] Inventors: J. Michael Yarborough; Gerald M. Mitchell; Kenneth J. Bossie, all of Tucson, Ariz.

[73] Assignee: Coherent, Inc., Palo Alto, Calif.

[21] Appl. No.: 944,447

[22] Filed: Sep. 14, 1992

Related U.S. Application Data

[63] Continuation-in-part of Ser. No. 838,574, Feb. 19, 1992, abandoned.

[51] Int. Cl.$^5$ .............................................. H01S 3/045
[52] U.S. Cl. .......................................... 372/35; 372/70
[58] Field of Search ......................... 372/35, 66, 70, 34

[56] References Cited

U.S. PATENT DOCUMENTS 4,563,763 1/1986 Kuhn ...................................... 372/35
4,751,716 6/1988 Ream et al. .

*Primary Examiner*—James W. Davie
*Attorney, Agent, or Firm*—Limbach & Limbach

[57] ABSTRACT

An optically-pumped solid state laser system having separate subsystems for cooling its gain medium and optical pumping assembly. The invention permits the operating temperatures of the gain medium and optical pumping assembly to be independently controlled, and permits a substantial increase in cooling efficiency as a result of independent control of coolant flow rates in the two cooling subsystems. In a class of preferred embodiments, the gain medium cooling subsystem includes a first channel through which coolant flows with relatively high flow rate and relatively low temperature (to maintain the gain medium at a desired low operating temperature), and the other cooling subsystem includes a second channel through which coolant flows with a relatively low flow rate and relatively high temperature. In one embodiment, the gain medium is a Holmium:YAG rod, and a Cerium doped glass tube surrounds the rod. Three to four gallons per minute of coolant flows through the tube to maintain the rod at an operating temperature in the range from about +10 to −15 degrees Celsius. The optical pumping assembly includes a set of flash lamps, and a Cerium doped glass tube surrounds each lamp. A total of no more than two gallons per minute of coolant flows through the tubes around the lamps, to maintain the lamps at a relatively high (but controlled) temperature.

18 Claims, 3 Drawing Sheets

SOLID STATE LASER WITH DUAL COOLING LOOPS

CROSS-REFERENCE TO RELATED APPLICATION

The present application is a continuation-in-part of U.S. patent application Ser. No. 07/838,574, filed Feb. 19, 1992.

FIELD OF THE INVENTION

The invention pertains to optically-pumped solid state lasers. More particularly, the invention pertains to an optically-pumped solid state laser system having separate subsystems for cooling the gain medium and the optical pumping means.

BACKGROUND OF THE INVENTION

Many conventional solid state laser systems employ optical pumping means to excite solid state gain media into a lasing state. For example, in one type of conventional solid state laser system, the gain medium is a cylindrical rod, and the optical pumping means comprises elongated flash lamps positioned parallel to the rod. Radiation for optically pumping the rod is focused from the lamps onto the rod's central longitudinal axis. The rod and the adjacent flash lamps are mounted within a reflective housing. The entire assembly (comprising rod, flash lamps, and housing) is referred to as a "laser head."

Most solid state gain media in common use can be maintained at a relatively high temperature during lasing operation. However, some solid state gain media, such as Holmium:YAG material, Holmium:YLF material, and other Holmium-doped gain media, are preferably maintained at a low temperature during lasing operation (for example, a low temperature in the range from about +10 degrees Celsius to as low as about −15 degrees Celsius). A cooling system is required for this purpose, since the flash lamps (or other optical pumping means) will otherwise increase the temperature of the entire laser head (including the gain medium) to undesirably high levels.

In cases where gain medium cooling is needed, the cooling is conventionally accomplished by flooding the interior of the laser head's reflective housing with flowing coolant fluid. The gain medium and the flash lamps are thus immersed in a common volume of coolant fluid during lasing operation.

The inventor has recognized that this conventional cooling technique has several serious limitations and disadvantages. First, the conventional technique is inefficient because the heat loads due to the optical pumping means and the gain medium are generally different, and the optimal operating temperature ranges of the optical pumping means and the gain medium are generally different. If the heat load from the gain medium is substantially greater than from the optical pumping means (for example, if a lasing rod must be maintained at very low temperature, such as −15 degrees Celsius, while flash lamps need only be cooled slightly) it would be sufficient to expose the optical pumping means to a turbulent flow of coolant having much lower flow rate than the flow of coolant employed to cool the gain medium. However, the flow rate of coolant which floods the entire prior art laser head (including rod and flash lamps) is much higher than would be adequate if coolant flow were confined to regions immediately adjacent the flash lamps and a region immediately adjacent the rod, with independently controlled (optimal) flow rates in these regions.

Second, the prior art technique does not permit precise control of the gain medium temperature during lasing operation. With better control of the gain medium's operating temperature than is possible using the prior art technique, improved solid state laser performance could be achieved.

SUMMARY OF THE INVENTION

The invention is an optically-pumped solid state laser system having separate subsystems for cooling its gain medium and optical pumping means. The invention permits the operating temperatures of the gain medium and pumping means to be independently controlled, and permits a substantial increase in cooling efficiency as a result of independent control of coolant fluid flow rates in the two cooling subsystems.

In a class of preferred embodiments, the gain medium cooling subsystem includes a first channel through which coolant flows at an optimal flow rate (typically, a relatively high flow rate) and relatively low temperature (to maintain the gain medium at a desired low operating temperature), and the optical pumping means cooling subsystem includes a second channel through which coolant flows at a different flow rate (typically, a turbulent flow having relatively low flow rate) and relatively high temperature.

In one such preferred embodiment, the gain medium is a Holmium:YAG rod (or a rod composed of another Holmium-doped gain material such as Holmium:YLF), and a tube (transmissive to the pumping radiation) surrounds the rod. Three to four gallons per minute of coolant flows through the tube to maintain the rod at an operating temperature in the range from about +10 to −15 degrees Celsius. The optical pumping means includes a set of flash lamps, and a tube (transmissive to the pumping radiation) surrounds each lamp. A total of no more than two gallons per minute of coolant flows through the tubes around the lamps, to maintain the lamps at a relatively high (but controlled) temperature. Preferably, the tubes are composed of Cerium doped glass, the coolant fluid for the lamps is Xenon gas, and the coolant fluid for the rod is a mixture of water and alcohol.

DETAILED DESCRIPTION OF THE PREFERRED EMBODIMENT

Figure 1:
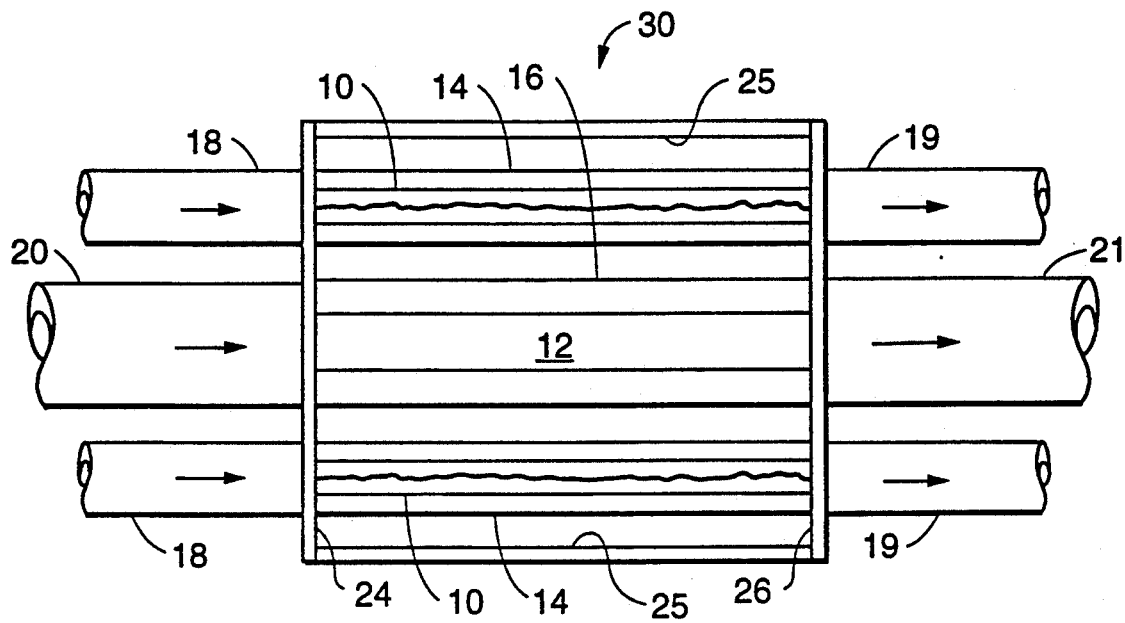
FIG. 1 is a simplified cross-sectional view of a solid state laser head which embodies the invention.

A preferred embodiment of the invention will be described first with reference to FIG. 1. Solid state laser head assembly 30 of FIG. 1 includes rod-shaped gain medium 12 (sometimes referred to herein as "rod" 12), elongated flash lamps 10 mounted on opposite sides of rod 12, and a housing which encloses rod 12 and flash lamps 10. Specifically, flash lamps 10 are mounted in orientations substantially parallel to rod 12 within a volume enclosed by housing end plates 24 and 26 and housing members 25. The inner surfaces of housing elements 24, 25, and 26 (surfaces which face lamps 10 and rod 12) are highly reflective of the optical "pumping" radiation emitted by lamps 10. Lamps 10 are positioned, and the curvatures of the reflective inner surfaces of elements 24–26 selected, so that pumping radiation from each lamp 10 (and reflections of this radiation from elements 24–26) is focused onto the central longitudinal axis of rod 12, to excite rod 12 into a lasing state.

A coolant flow tube 16 surrounds rod 12, and a separate coolant flow tube 14 surrounds each of lamps 10. Each of tubes 14 and 16 is transmissive (preferably, highly transmissive) at pumping radiation wavelengths. Of course, if only one lamp 10 or more than two flash lamps 10, are employed, a tube 14 surrounds each lamp 10.

Coolant fluid flows into one end of tube 16 from hose 20. This fluid floods rod 12 as it flows through the annular region between rod 12 and tube 16, and then flows out the other end of tube 16 into hose 21.

Similarly, coolant fluid flows into an end of each tube 14 from a corresponding hose 18. This fluid floods the lamps 10 as it flows through the annular region between each lamp 10 and the surrounding tube 14, and then flows out the other ends of tubes 14 into corresponding hoses 19. In general, the coolant fluid flowing within tubes 14 has a different chemical composition and flow rate than the fluid flowing within tube 16.

Figure 2:
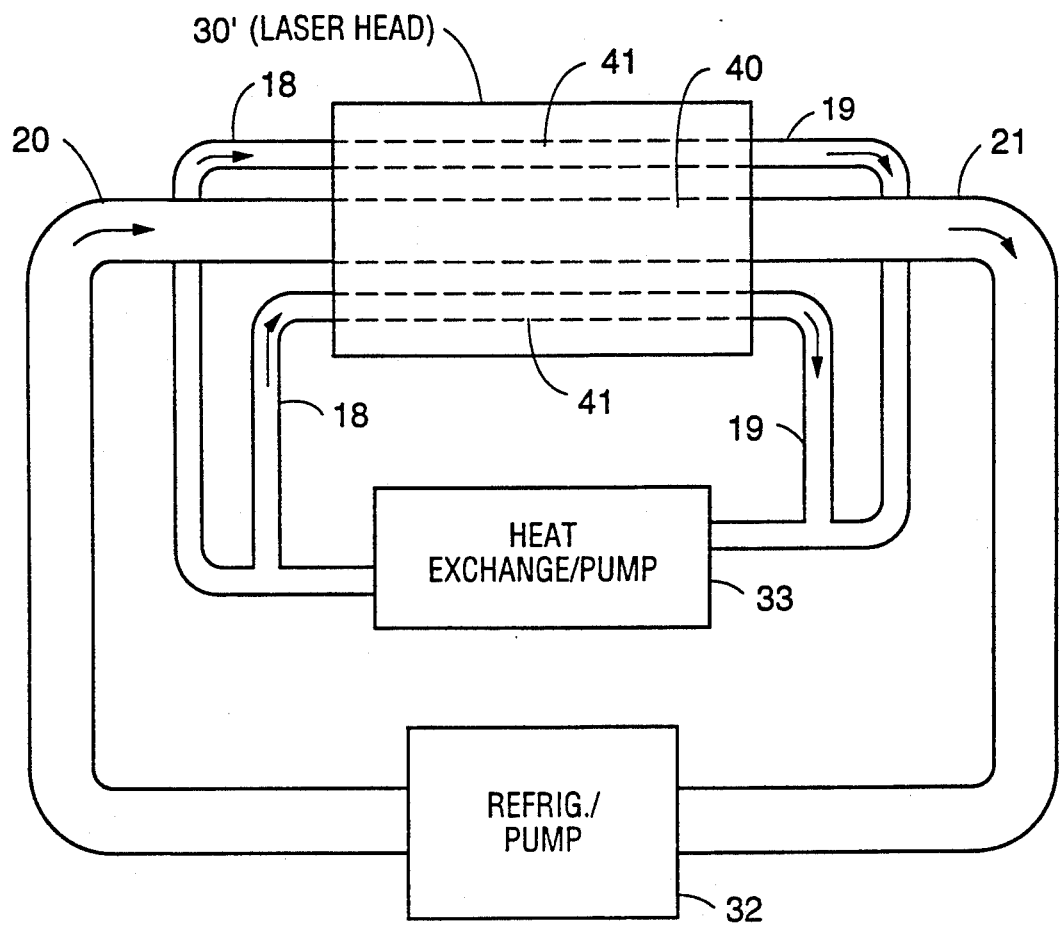
FIG. 2 is a schematic diagram of a preferred embodiment of the inventive solid state laser system.

As shown in FIG. 2, a first coolant loop includes inlet hose 20, laser head assembly 30', outlet hose 21, and refrigeration and pumping apparatus 32. Apparatus 32 pumps low temperature coolant through hose 20 into first volume 40 within assembly 30' (e.g., volume 40 can be defined by a tube 16 as shown in FIG. 1) at a selected flow rate and temperature, and cools the higher temperature coolant that returns to it from volume 40 through hose 21. A second, independently controllable, cooling system includes an inlet hose (including two branch hoses 18), laser head assembly 30' an outlet hose (including two branch hoses 19), and heat exchanger and pumping apparatus 33. Apparatus 33 pumps coolant through hoses 18 into second volume 41 within assembly 30' (volume 41 can be defined by tubes 14 as shown in FIG. 1) at a selected flow rate and temperature, and cools the higher temperature coolant that returns to it from volume 41 through hoses 19.

In a preferred embodiment, assembly 30' in FIG. 2 is identical to assembly 30, and includes a rod 12 composed of a Holmium:YAG material. The rod is maintained at a very low temperature (in the range from 10 degrees to −15 degrees Celsius) during lasing operation. Apparatus 32 pumps three to four gallons per minute of a liquid water/alcohol coolant mixture (preferably consisting of about 50% water, and 50% methanol) through hose 20 to maintain the rod at an operating temperature in the desired range.

In this embodiment, the optical pumping means includes two flash lamps, which can tolerate a much higher operating temperature than the rod. Apparatus 33 accordingly pumps coolant (preferably Xenon gas) through hoses 18 at a substantially higher temperature than the desired rod temperature. Apparatus 33 preferably produces a turbulent flow of coolant through volume 41 at a flow rate substantially lower than the rod coolant flow rate (i.e., at a flow rate not greater than two gallons per minute).

This embodiment permits significant reduction in cost, power consumption, and complexity of the required coolant refrigeration and pumping equipment. Specifically, refrigeration and pumping apparatus 32 can be much cheaper and smaller, and with much lower power consumption, than would be required in a prior art system of the "flooded cavity" type (which floods the entire volume within the laser head assembly with coolant) to maintain a rod (i.e., a Holmium:YAG rod) at temperature in the range +10 degrees to −15 degrees Celsius during lasing operation. The total power consumption of such a conventional cooling system would be on the order of 1800 watts, while the total power consumption of apparatuses 32 and 33 in the described preferred embodiment of the invention is about 300 watts.

In one implementation of this embodiment, tubes 14 and 16 are 7.8 cm in length, and rod 12 has a diameter of 4 mm. Tubes 14 and 16 are preferably composed of Cerium doped glass (which is highly transmissive to the optical pumping radiation emitted by flash lamps 10).

Alternatively, rod 12 can be composed of a Holmium-doped gain material other than Holmium:YAG (such as Holmium:YLF material).

Figure 3:
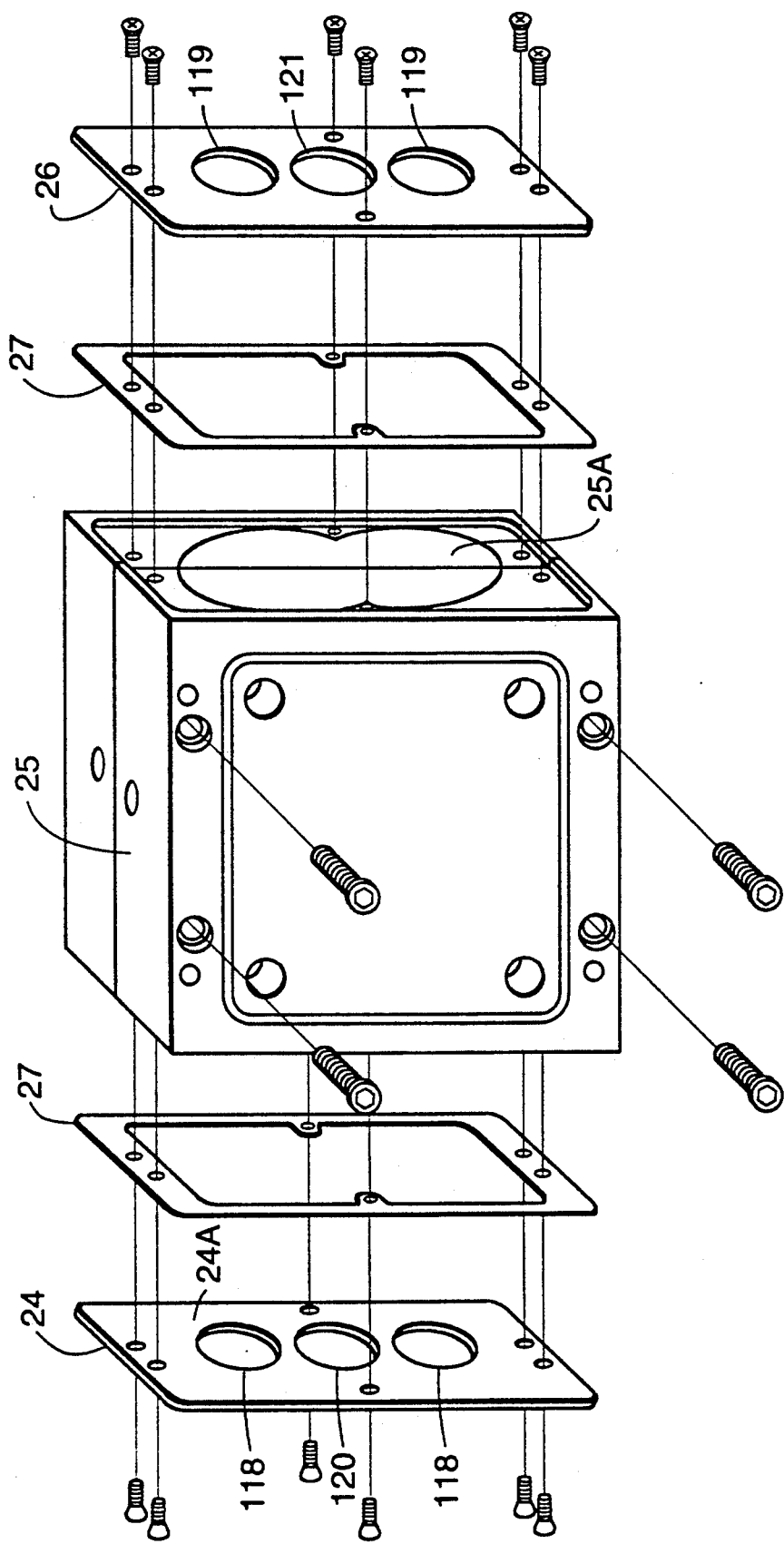
FIG. 3 is an exploded perspective view of the housing of the solid state laser head shown in FIG. 1
Figure 4:
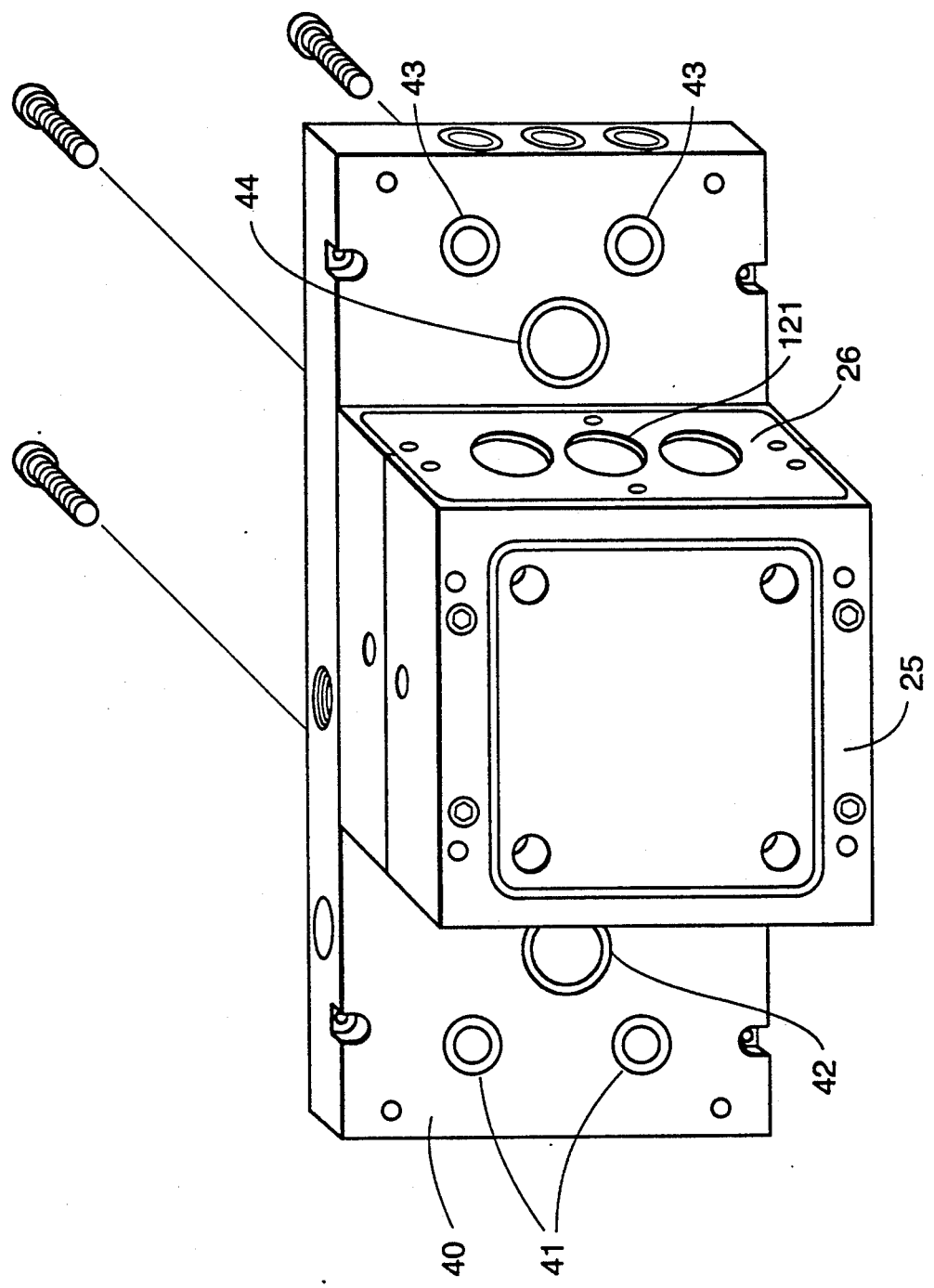
FIG. 4 is a perspective view of the assembled housing of FIG. 3, mounted to a manifold assembly.

With reference to FIGS. 3 and 4, a preferred embodiment of housing end plates 24 and 26 and housing members 25 (shown in simplified view in FIG. 1) will next be described. To assemble the housing, members 25 are fastened together, and end plates 24 and 26 are then fastened onto the ends of assembled members 25 with a gasket 27 compressed between members 25 and plate 24 and between members 25 and plate 26.

A gain medium assembly (including a gain medium rod, a coolant flow tube surrounding the rod, and end mirrors at the ends of the rod) can be mounted between hole 120 of plate 24 and hole 121 of plate 26. A flash lamp assembly (including a flash lamp and a surrounding coolant flow tube) is mounted between upper hole 118 of plate 24 and upper hole 119 of plate 26, and an identical flash lamp assembly is mounted between lower hole 118 of plate 24 and lower hole 119 of plate 26.

Curved inner surface 25a defined by assembled members 25, flat inner surface 24a of plate 24, and a flat inner surface (not visible in FIG. 3) of plate 26 are highly reflective of optical pumping radiation emitted by the lamp. The lamps are so positioned, and the curvature of surface 25a is such, that pumping radiation from each lamp (and reflections of this radiation from surface 25a) is focused onto the central longitudinal axis of the rod (the axis through the centers of holes 120 and 121.

As indicated in FIG. 4, the assembled laser head housing (comprising elements 24, 24, and 26) is fastened onto a manifold 40. Above-described inlet hose 20 can be connected the gain medium tube at hole 120, and then inserted into manifold 40 through an orifice lined with O-ring 42. Similarly, above-described outlet hose 21 can be connected the other end of the gain medium tube at hole 121, and then inserted into manifold 40 through an orifice lined with O-ring 44, above-described hoses 18 can be connected to the flash lamp coolant tubes at holes 118, and then inserted into manifold 40 through orifices lined with O-rings 41, and above-described hoses 19 can be connected to the other ends of the flash lamp coolant tubes at holes 119, and then inserted into manifold 40 through orifices lined with O-rings 43.

Various modifications and alterations in the structure and method of operation of the invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A solid state laser system, including:
a gain medium;
an optical pumping means spatially separated from the gain medium;
the first coolant flow channel surrounding the optical pumping means; and
a second coolant flow channel surrounding the gain medium, wherein the optical pumping means includes at least one flash lamp which emits pumping radiation, the first coolant flow channel includes a first tube which is transmissive to the pumping radiation and includes a first coolant gas flowing therethrough, and the second coolant flow channel includes a second tube which is transmissive to the pumping radiation and includes a second coolant fluid flowing therethrough, wherein the second coolant fluid is a liquid mixture of water and alcohol.

2. The system of claim 1, wherein the gain medium is rod-shaped, the optical pumping means comprises at least one flash lamp which emits pumping radiation, the first coolant flow channel includes a first tube transmissive to the pumping radiation, and the second coolant flow channel includes a second tube transmissive to the pumping radiation.

3. The system of claim 2, wherein the first tube and the second tube are composed of Cerium doped glass.

4. The system of claim 1, wherein the gain medium is a rod composed of Holmium:YAG material.

5. The system of claim 1, wherein the gain medium is a rod composed of Holmium:YLF material.

6. The system of claim 1, wherein the gain medium is a Holmium-doped rod, the first coolant gas has a temperature and flow rate sufficient to maintain the optical pumping means at a first temperature, and the second coolant fluid has a temperature and flow rate sufficient to maintain the rod at a second temperature lower than the first temperature during lasing operation.

7. The system of claim 6, wherein the Holmium-doped rod is composed of Holmium-YAG material.

8. The system of claim 6, wherein the second temperature is in the range from +10 degrees Celsius to −15 degrees Celsius.

9. The system of claim 8, wherein the first coolant gas is Xenon gas having a first flow rate, and the second coolant fluid has a second flow rate substantially greater than the first flow rate.

10. The system of claim 9, wherein the first flow rate is not greater than two gallons per minute, and the second flow rate is in the range from three to four gallons per minute.

11. The system of claim 6, wherein the first coolant gas is Xenon gas.

12. The system of claim 1, wherein the first coolant gas maintains the optical pumping means at a first temperature, and the second coolant fluid maintains the gain medium at a second temperature lower than the first temperature during lasing operation.

13. A cooling system for a laser including a solid state gain medium and an optical pumping means spatially separated from said gain medium, said cooling system including:
a first coolant flow channel surrounding the optical pumping means;
a second coolant flow channel surrounding the gain medium;
first coolant means for pumping a first coolant gas having a first flow rate and a first temperature into the first coolant flow channel; and
second coolant means for pumping a second coolant fluid having a second flow rate and a second temperature into the second coolant flow channel, wherein the second coolant fluid is a liquid mixture of water and alcohol.

14. The system of claim 13, wherein the first coolant flow channel includes a first glass tube, the second coolant flow channel includes a second glass tube, the first coolant means includes a first hose connected to an inlet end of the first glass tube, and the second coolant means includes a second hose connected to an inlet end of the second glass tube.

15. The system of claim 14, wherein the gain medium is a rod composed of Holmium:YAG material, the optical pumping means includes at least one flash lamp which emits pumping radiation, and the first glass tube and the second glass tube are transmissive to the pumping radiation, and the second temperature and the second flow rate are sufficient to maintain the rod at an operating temperature substantially lower than the first temperature during lasing operation.

16. The system of claim 15, wherein the operating temperature is in the range from +10 degrees Celsius to −15 degrees Celsius.

17. The system of claim 13, wherein the first coolant gas is Xenon gas, and the second flow rate is substantially greater than the first flow rate.

18. The system of claim 19, wherein the first flow rate is not greater than two gallons per minute, and the second flow rate is in the range from three to four gallons per minute.

* * * * *